United States Patent [19]

Togo et al.

[11] Patent Number: 4,873,475
[45] Date of Patent: Oct. 10, 1989

[54] ELECTRICALLY POWERED POWER STEERING SYSTEM FOR INDUSTRIAL VEHICLE OR THE LIKE

[75] Inventors: Sigeru Togo, Akigawa; Yoichi Saito, Musashimurayama; Masayuki Tateyama; Genji Okuma, both of Oume; Hiroya Miyazaki, Maebashi, all of Japan

[73] Assignee: Nissan Motor Co., Ltd., Yokohama, Japan

[21] Appl. No.: 79,068

[22] Filed: Jul. 29, 1987

[51] Int. Cl.$^4$ .............................................. B62D 5/04
[52] U.S. Cl. ...................................... 318/489; 318/2; 318/488
[58] Field of Search ................... 318/2, 283, 445, 452, 318/488, 489; 180/79.1; 74/388 PS

[56] References Cited

U.S. PATENT DOCUMENTS

| | | | |
|---|---|---|---|
| 2,754,465 | 7/1956 | Brier | 318/488 |
| 3,344,328 | 9/1967 | Morris | 318/258 |
| 3,681,671 | 8/1972 | Elliott | 318/481 |
| 3,949,284 | 4/1976 | Wright | 318/283 X |
| 4,008,779 | 2/1977 | Shinoda et al. | 318/139 X |
| 4,350,219 | 9/1982 | Olbrich et al. | 318/113 X |
| 4,481,449 | 11/1984 | Rodal | 318/375 |

*Primary Examiner*—Bentsu Ro
*Attorney, Agent, or Firm*—Foley & Lardner, Schwartz, Jeffery, Schwaab, Mack, Blumenthal & Evans

[57] ABSTRACT

In order to prevent a sudden kickback through the steering wheel which tends to occur when an electrically powered steering motor is de-energized and the vehicle tires are distorted by steering a low speeds and act as springs which cause the steering shaft to suddenly rotate in the reverse direction to that induced by the motor immediately before the de-energization, a circuit is provided which upon a manually operable switch which controls the power supply being moved to an open position, continues to supply a gradually decreasing level of power to the motor control circuit so that in the event that the driver is still applying a torque to the steering wheel, the motor produces a gradually reducing torque which allows the tire distortion to be relieved slowly and obviate any shock to the driver via the steering wheel.

7 Claims, 2 Drawing Sheets

ELECTRICALLY POWERED POWER STEERING SYSTEM FOR INDUSTRIAL VEHICLE OR THE LIKE

BACKGROUND OF THE INVENTION

1. Field of the Invention

The present invention relates to a power steering for a wheeled vehicle and more specifically to an electrically driven power steering for an industrial vehicle such as a fork lift or the like which is operated on electrical power and which is subject to high loads.

2. Description of the Prior Art

Japanese Patent Application Provisional Publication 60-226359 discloses a power steering arrangement wherein an electric motor is disposed between the main steering shaft and the output shaft. One end of the driven shaft of the motor is connected to the main steering shaft through a deformable elastomeric member while the other end is connected to the output shaft through a gearing. A sensor is disposed in the elastomeric member and arranged to output a signal indicative of a torque being applied to the steering wheel or the like operatively connected with the steering main shaft.

The motor control circuit includes a battery, a key switch circuited with the steering sensor and a relay. This relay serves to connect the motor with the battery when closed.

However, this arrangement has suffered from the drawback that when the wheels are steered a low speeds or standstill for example, the elastomeric material of the tires is distorted. Thus, in the event that if driver is still in the process of steering the wheels of the vehicle by rotating the steering wheel at the time the power to the motor is cut off by the opening of any relay, the distortion in the tires induced by the operation of the motor, acts a spring and a reverse torque is suddenly applied back through the shafts and elastomeric member to the steering wheel producing a strong and unpleasant kickback.

SUMMARY OF THE INVENTION

It is an object of the present invention to provide a system which obviates sudden applications of torque to the steering wheel when the power to the power steering motor of an electrically powered steering system is cut-off.

In brief, the above object is achieved by an arrangement wherein a circuit is provided which upon a manually operable switch, which controls the power supply, being conditioned to assume an open position, continues to supply a gradually decreasing level of power to the motor control circuit so that in the event that the driver is still applying a torque to the steering wheel the motor produces a gradually reducing torque which allows the tire distortion to be relieved slowly and obviate any shock to the driver via the steering wheel.

More specifically, the present invention is deemed to take the form of a power steering system which features a sensor for sensing the direction in which a steering column is being rotated and producing an output indicative thereof; an electric motor; a motor control circuit for controlling the motor in response to the output of the sensor; a source of electrical power; a manually operable switch; a power supply circuit which supplies power from the source to the motor control circuit when the switch is closed; and means for continuing the supply of electrical power from said source to said motor control circuit for a predetermined time after the switch is opened.

DETAILED DESCRIPTION OF THE PREFERRED EMBODIMENTS

Figure 1:
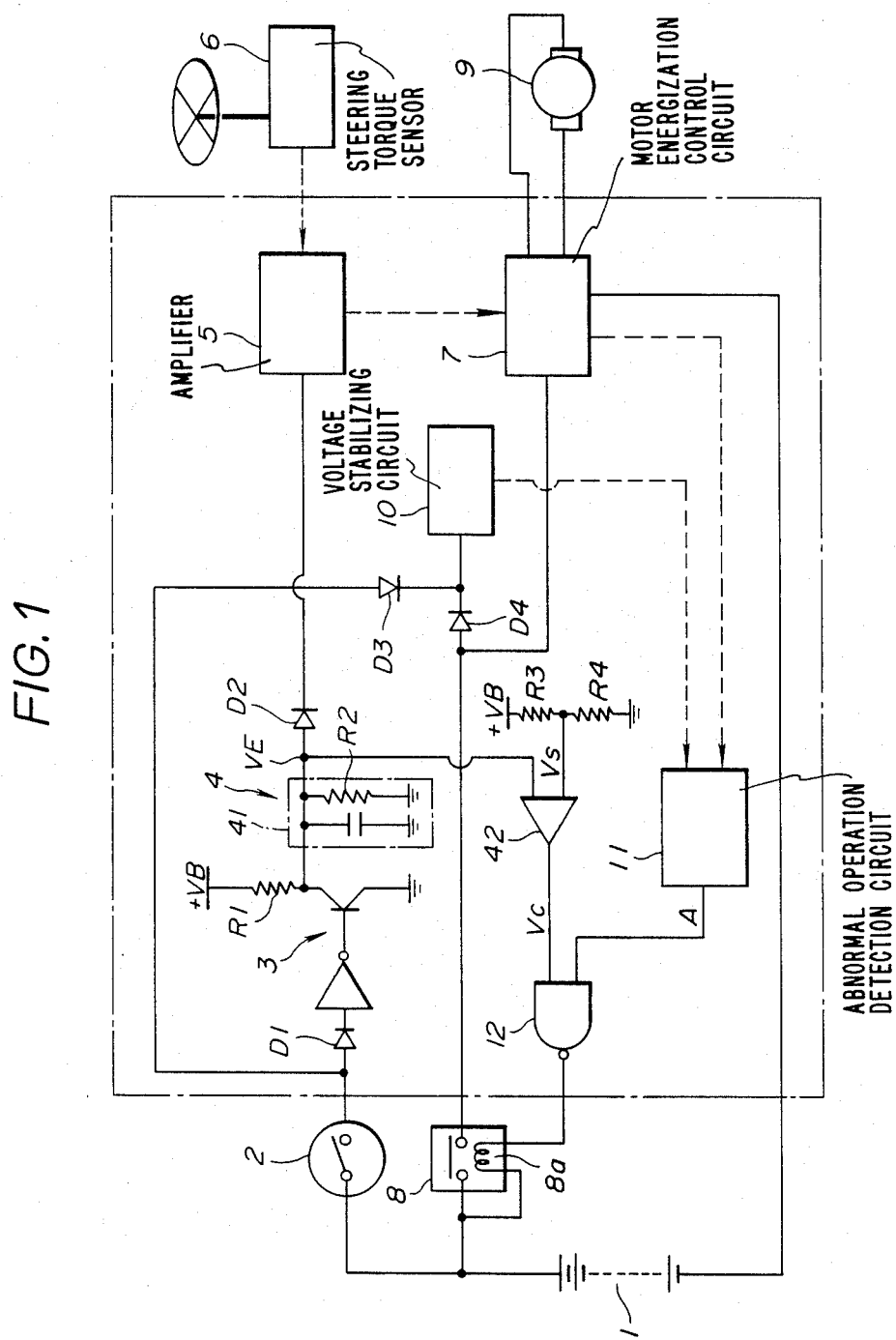
FIG. 1 is a circuit diagram showing a power steering motor control circuit according to an embodiment of the present invention.

FIG. 1 shows a motor control circuit incorporating an embodiment of the present invention. In this arrangement a battery (or batteries) 1 defines a power source which is connected through a key switch 2 to a non-operational mode detection section 3, a voltage holding section 4 and amplifier 5.

The non-operational mode detection section 3 includes a diode D1, an inverter 31 and a NPN type switching transistor 32. The base of this transistor 32 is connected to the output of the inverter 31 while the collector is connected to a source of predetermined or fixed voltage +VB through a resistor R1. The emitter of the transistor is grounded.

The voltage holding section 4 is connected to a terminal defined between the collector of transistor 32 and the resistor R1 and includes a condensor C and a discharge resistor R2 which defines an averaging circuit 41. A comparator 42 is connected to (a) a junction defined between the resistor R2 and a diode D2 so as receive a voltage VE appearing thereon; and (b) to a voltage divider comprised of resistors R3 and R4 which are serially connected between the source of fixed voltage +VB. The voltage divider applies a predetermined reference voltage VS to the comparator 42. When the voltage VE becomes equal to or greater than the reference level VS the comparator 42 outputs a voltage VC to a first input of a NAND gate 12. The second input of this gate is arranged to receive a signal A which is produced by an abnormal operation detection circuit 11.

The amplifier 5 receives the voltage signal (VE) produced by the voltage holding section 4 via the diode D2 along with a signal from a steering torque sensor 6. This sensor is operatively connected with the steering wheel of the vehicle (no numeral).

The amplifier 5 outputs a signal which is fed to a motor energization control circuit 7. This circuit receives electrical power from the battery 1 via an external relay 8 and supplies the same to a motor 9 in response to the signal produced by the steering torque sensor 6.

The output sides of the key switch 2 and the relay 8 are connected through diodes D3 and D4 respectively to a voltage stablizing circuit 10. This circuit 10 outputs a signal to the above mentioned abnormal operation detection circuit 11 which compares it with a signal indicative of the load applied to the motor 9. In the event that the motor is operating within acceptable limits, circuit 11 outputs a high level signal to the NAND gate 12 while in the event of an abnormality being detected, a low level is produced. The output of the NAND gate is applied to the coil 8a of the relay 8.

In operation when the key switch is open (OFF), the output of inverter 31 and the non-operational detection section 3 assumes a high level. The transistor 32 is rendered conductive and the voltage appearing on the collector assumes a low level. This maintains the capacitor C in a discharged state and the voltage VE appearing on the junction between the averaging circuit and the diode D2 at a low level.

The voltage stabilizing circuit 10 is constantly supplied power from the battery via an non-illustrated connection therewith and outputs a signal indicative thereof. In response to this, the abnormal operation detection circuit 11 outputs a high level signal to the NAND gate 12. The NAND gate responds and applies a high level signal to the coil 8a of the relay 8. This blocks the flow of current from the battery through the coil 8a and thus maintains the normally open relay 8 open in a manner which prevents current from flowing to the motor 9.

When the key switch is closed (ON) current is applied via diode D3 to the voltage stabilizing circuit 10 in response to which the output of the abnormal operation detection circuit 11 is reversed and assumes a low level. The output of the inverter 31 also changes to a low level in response the application of current thereto via diode D1. The transistor 32 is rendered non-conductive and the grounding of resistor R1 terminated. The voltage VE rapidly builds and is applied via diode D2 to amplifier 5. At the same time the output VC of the comparator 42 switches to a high level.

In response to the above, the NAND gate 12 output changes to a low level and current from the battery 1 is permitted to flow through the coil 8a and to earth through a non-illustrated transistor which forms a part of the NAND gate. The coil 8a is energized and the relay is closed to permit current to flow from the battery 1 to the motor control circuit 7.

While the steering wheel is not manipulated, the output of the steering torque sensor 6 is zero and accordingly the output of the motor control circuit 7 is controlled to the same level. However, when the steering wheel is rotated, the output of the steering torque sensor 6 changes in manner which is indicative of both the rotational force and the direction in which the steering wheel is being rotated. For example, if the wheel is rotated in the clockwise direction the amplifier outputs a positive voltage signal while when rotated in the counterclockwise direction a negative voltage is produced. The motor control circuit 7 responds to the signal from the amplifier and energizes the motor 9 so as to rotate in the appropriate direction.

Thus, while the key switch is closed the electric motor 9 will respond to the rotation of the steering wheel in a manner which assists the steering of the vehicle wheels.

Figure 2:
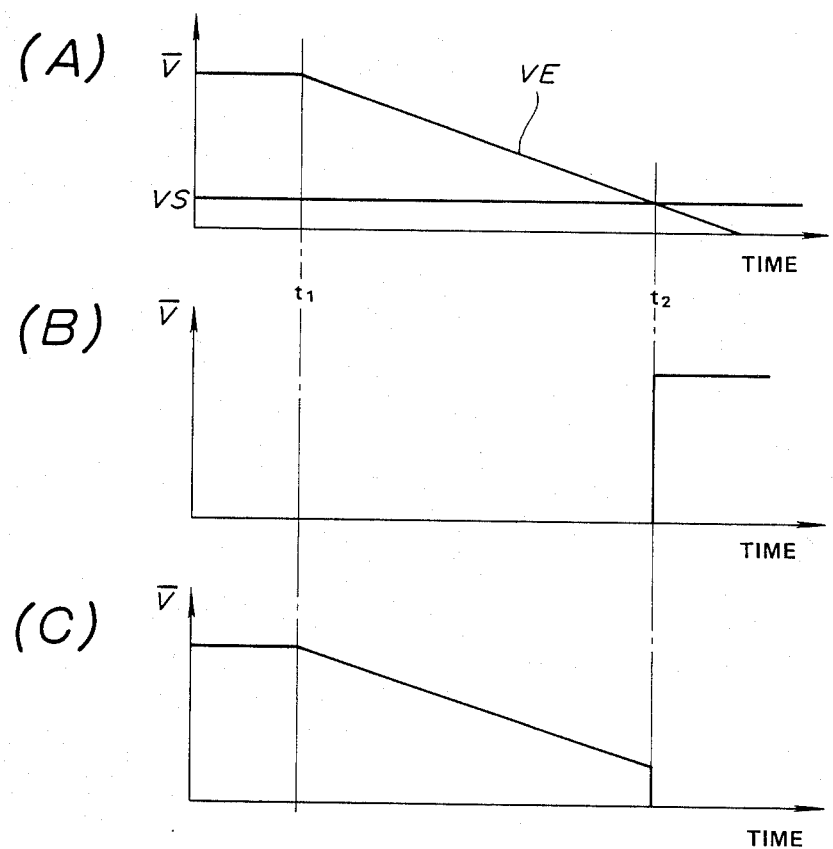
FIG. 2 is a timing chart showing the changes in voltage which occur in the circuit arrangement shown in FIG. 1.

When the vehicle is at a standstill and the key switch 2 is opened (OFF) at a time t1 the output of the inverter 31 changes to a high level and renders transistor 32 conductive. In response to this the voltage appearing on the collector of the transistor 32 drop to ground level and the charge stored in the capacitor C discharges by way of resistor R2. The voltage VE lowers in a manner shown in FIG. 2(a). The rate at which the voltage lowers is of course dependent on the capacitance of the capacitor C and the resistance of resistor R2. Under these conditions the output VC of comparator 42 remains at a high level. The voltage stablizer circuit 10 as mentioned above is constantly supplied power from the battery 1 and thus maintains the level of the abnormal operation detection circuit 11 output A at a high level. Accordingly, the NAND gate 12 output is maintained a low level until such time as the value of VE lowers to that of the reference voltage VS applied to the comparator 42 from the voltage divider (R3, R4). As shown in FIG. 2(a) at time t2 the level of VE drops to that of VS and the output of the NAND gate 12 (see FIG. 2(b)) switches to a high level. This blocks the flow of current through the coil 8a and induces the relay 8 to open. However, until this time (viz., t2) the voltage VE is applied to amplifier 5 and in the event that the driver still has hold of the steering wheel and is applying a torque thereto, a signal is generated by the steering torque sensor 6 with result that the motor control circuit 7 (which is connected via the relay 8 to the battery 1 until time t2) supplies power to the motor 9 in a manner shown in FIG. 2(c).

Accordingly, as the torque developed by the motor diminishes gradually over the period t2-t1 any distortion in the vehicle tires which tends to move the tires in the reverse direction to that induced by the operation of the motor 9, is relieved slowly as the torque produced by the motor 9 gradually diminishes. This obviates the sudden and sharp kickback problem encountered with the prior art.

In the above disclosed embodiment the voltage holding circuit is disposed between the key switch 2 and the amplifier 5. However, it is within the scope of the present invention to incorporate a circuit which produces a similar function into either the amplifier 5 of the motor control circuit 7. Further, it is possible to omit the inverter 31 by using a PNP type transistor in place of the NPN type disclosed hereinbefore in connection with element 32.

What is claimed is:

1. A power steering system, comprising:
   a sensor for sensing the direction in which a steering column is being rotated and producing an output signal indicative thereof;
   an electric motor;
   a motor control circuit for controlling the motor in response to the output signal of the sensor;
   a source of electrical power;
   a manually operable switch;
   a power supply circuit which supplies power from the source to the motor control circuit when the switch is closed; and
   means for gradually decreasing the supply of electrical power from said source to said motor control circuit for a predetermined time after the switch is opened.

2. A power steering system as claimed in claim 1 wherein said power supply circuit comprises:
   a relay, said relay being arranged to be normally open, and closed when a coil thereof is energized;
   a non-operational mode detection circuit, said non-operational mode detection circuit being connected with and responsive to the switch assuming as open position for preventing the flow of current through the coil of said relay and responsive to said switch assuming a closed position for permitting current to flow through the coil.

3. A power steering system as claimed in claim 2 wherein said decreasing supply means is a capacitor and a resistor interconnected in the manner that when said switch is opened, said capacitor discharges through said resistor and thus causes the voltage between the capacitor and the resistor to decrease gradually.

4. A power steering system as claimed in claim 3 wherein the rate at which the voltage decreases in determined by the capacitance of the capacitor and the resistance of the resistor.

5. A power steering system as claimed in claim 1 wherein said decreasing supply means is a capacitor and a resistor interconnected in a manner that when said switch is opened, said capacitor discharges through said resistor and thus cause the voltage between the capacitor and the resistor to decrease gradually.

6. A power steering system as claimed in claim 5 wherein the rated at which the voltage decreases is determined by the capacitance of the capacitor and the resistance of the resistor.

7. A power steering system, comprising:
- a sensor for sensing the direction in which a steering column is being rotated and producing an output signal indicative thereof;
- an electric motor;
- a motor control circuit for controlling the motor in response to the output signal of the sensor;
- a source of electrical power;
- a manually operable switch;
- a power supply circuit which supplies power from the source to the motor control circuit when the switch is closed;
- a means for gradually decreasing the electrical power from said source to said motor control circuit for a predetermined time after the switch is opened;
- a relay being arranged to be normally open, and closed when a coil thereof is energized;
- an abnormal operation mode detecting circuit, said abnormal mode detection circuit being operatively connected with a gate circuit which receives an input from a comparator, said comparator receiving an input from said electrical power decreasing means, a reference voltage source, said gate circuit being connected with said coil so that, when said gate circuit produces a high level output, current is prevented from flowing through said coil, and when said gate circuit produces a lower level output, the coil is grounded through said gate circuit, energizing and closing said coil; and
- a non-operational mode detection circuit, said non-operational mode detection circuit responsive to the switch assuming an open position for preventing the flow of current through the coil of said relay and responsive to said switch assuming a closed position permitting current to flow through the coil.

* * * * *